US012780443B2

(12) United States Patent
Koike et al.

(10) Patent No.: US 12,780,443 B2
(45) Date of Patent: Nov. 3, 2026

(54) DISPLAY PROGRAM FOR ASSISTING IN DETERMINING AIRCRAFT ROUTE

(71) Applicant: MTI Ltd., Tokyo (JP)

(72) Inventors: Kana Koike, Tokyo (JP); Masataka Tsuchiya, Tokyo (JP); Hitoshi Ohtomo, Tokyo (JP)

(73) Assignee: MTI Ltd., Tokyo (JP)

( * ) Notice: Subject to any disclaimer, the term of this patent is extended or adjusted under 35 U.S.C. 154(b) by 12 days.

(21) Appl. No.: 18/881,508

(22) PCT Filed: May 29, 2023

(86) PCT No.: PCT/JP2023/019937

§ 371 (c)(1),
(2) Date: Jan. 6, 2025

(87) PCT Pub. No.: WO2024/024257

PCT Pub. Date: Feb. 1, 2024

(65) Prior Publication Data

US 2026/0001658 A1 Jan. 1, 2026

(30) Foreign Application Priority Data

Jul. 25, 2022 (JP) ................................ 2022-117938

(51) Int. Cl.
*B64D 45/00* (2006.01)
*B64D 43/00* (2006.01)
*G01C 21/20* (2006.01)

(52) U.S. Cl.
CPC ............ *B64D 45/00* (2013.01); *B64D 43/00* (2013.01); *G01C 21/20* (2013.01)

(58) Field of Classification Search
CPC .......... B64D 43/00; B64D 45/00; G08G 5/51; G01C 21/20; G01C 23/00; G01W 1/10
See application file for complete search history.

(56) References Cited

U.S. PATENT DOCUMENTS 6,356,228 B1 3/2002 Tomita
6,653,947 B2 * 11/2003 Dwyer ..................... G01S 7/22 340/961

(Continued)

FOREIGN PATENT DOCUMENTS

JP 2021-140685 A 9/2021
JP 2022-651 A 1/2022

(Continued)

OTHER PUBLICATIONS

English translation of International Search Authority's Written Opinion for PCT/JP2023/019937; date of mailing Jul. 4, 2023; all pages relevant; retrieved from https://patentscope.wipo.int/search/en/detail.jsf?docId=WO2024024257 (Year: 2023).*
"3D Weather Information for Safer and MoreEfficient Aircraft Operation", MTI Ltd., Jul. 27, 2021, <https://www.aviavi-arvi.com/news/174.html>, cited in ISR, w/English machine translation (7 pages).

(Continued)

*Primary Examiner* — Calvin Cheung
(74) *Attorney, Agent, or Firm* — WHDA, LLP

(57) ABSTRACT

A route acquisition process of acquiring a route, a weather risk acquisition process of acquiring a weather risk as three-dimensional information, a first display process of displaying, in plan view, at least each of the route and the weather risk together, and a second display process of displaying the route and the weather risk together on a cross section cut vertically along the route are executed.

7 Claims, 14 Drawing Sheets

(56) References Cited

U.S. PATENT DOCUMENTS

| | | | | |
|---|---|---|---|---|
| 9,057,773 | B1 * | 6/2015 | Fersdahl | G01S 13/953 |
| 2006/0271249 | A1 * | 11/2006 | Testrake | G09B 9/08 701/4 |
| 2010/0265125 | A1 * | 10/2010 | Kelly | G01W 1/04 342/179 |
| 2014/0331161 | A1 * | 11/2014 | Venkataswamy | G01W 1/02 715/771 |
| 2020/0363460 | A1 | 11/2020 | Kobayashi | |
| 2024/0019572 | A1 * | 1/2024 | Joyce | B64D 45/00 |

FOREIGN PATENT DOCUMENTS

| | | | |
|---|---|---|---|
| JP | 1718135 | S | 6/2022 |
| WO | 00/57383 | A1 | 9/2000 |
| WO | 2009/101988 | A1 | 8/2009 |

OTHER PUBLICATIONS

"3D aviation weather app "3DARVI" service introduction movie" in Japanese, MTI Ltd., Oct. 5, 2021, <https://www.youtube.com/watch?v=e4yHwMyRwkc&t=8s>, cited in ISR (2 pages).

"3D Aviation Weather Service "3D ARVI" Introduction movie", MTI Ltd., Jun. 14, 2022, <https://www.youtube.com/watch?v=CMJDPR1QNso&t=1s>, cited in ISR (2 pages).

International Search Report dated Jul. 4, 2023, issued in counterpart International Application No. PCT/JP2023/019937, w/English translation (7 pages).

Written submission of proving document for exceptions to lack of novelty submitted on Aug. 24, 2022 for JP Patent Application No. 2022-117938, w/English translation (43 pages).

* cited by examiner

DISPLAY PROGRAM FOR ASSISTING IN DETERMINING AIRCRAFT ROUTE

TECHNICAL FIELD

The present invention relates to a display program for assisting in determining an aircraft route.

BACKGROUND ART

Weather has a significant impact on aircraft operation in terms of safety and cost, such as fuel cost. For example, aircraft operation suffers many lightning strikes throughout the year. Although a lightning strike on an aircraft is extremely unlikely to lead directly to a serious accident, the lightning strike damages a skin of a fuselage and the like. Repair of such damage is said to incur an expense of several hundred million yen per year.

Inspection of and first-aid treatment to an aircraft struck by lightning require time, which affects a flight schedule regardless of the damage scale. This not only incurs an expense for repair of damage from a lightning strike but also causes an increase in indirect costs.

Methods for evaluating a lightning strike risk include one which uses observation data from a weather radar and lightning data to evaluate the risk (Patent Document 1).

CITATION LIST

Patent Documents

Patent Document 1: Japanese Patent Laid-Open No. 2022-651

SUMMARY OF THE INVENTION

Problem to be Solved by the Invention

Even if the related art as described above can, for example, evaluate a lightning strike risk, the related art cannot set an aircraft route with the risk in mind.

The present invention has been made in view of the above-described problem, and has as its object to provide a display program for assisting in determining an aircraft route with a weather risk, such as a lightning strike risk, in mind.

Means for Solving the Problem

The present invention is a display program for assisting in determining an aircraft route, the program executing a route acquisition process of acquiring a route, a weather risk acquisition process of acquiring a weather risk as three-dimensional information, a first display process of displaying, in plan view, at least each of the route and the weather risk together, and a second display process of displaying the route and the weather risk together on a cross section cut vertically along the route.

Effect of the Invention

According to the present invention, it is possible to provide a display program for assisting in determining an aircraft route with a weather risk in mind.

DESCRIPTION OF EMBODIMENTS

Figure 1A:
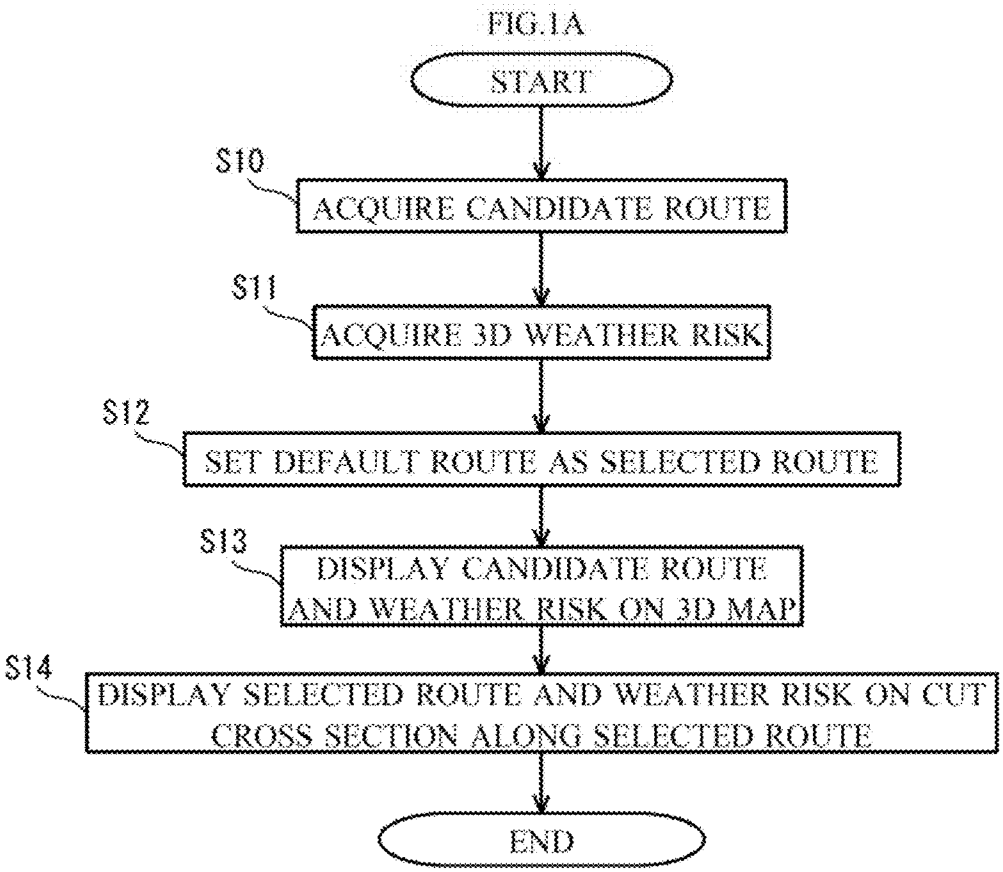
FIG. 1A is a flow showing a route display process.

An embodiment of the present invention will be described below with reference to the drawings. Note that the same constituent elements are denoted by identical reference numerals in all the drawings, and a description thereof will not be repeated.

Concerning Outline of Display Program for Assisting in Route Determination According to Present Embodiment First, an outline of a display program for assisting in determining an aircraft route (hereinafter referred to as a "display program for assisting in route determination") according to the present embodiment will be described with reference to FIGS. 1A to 4.

Figure 1B:
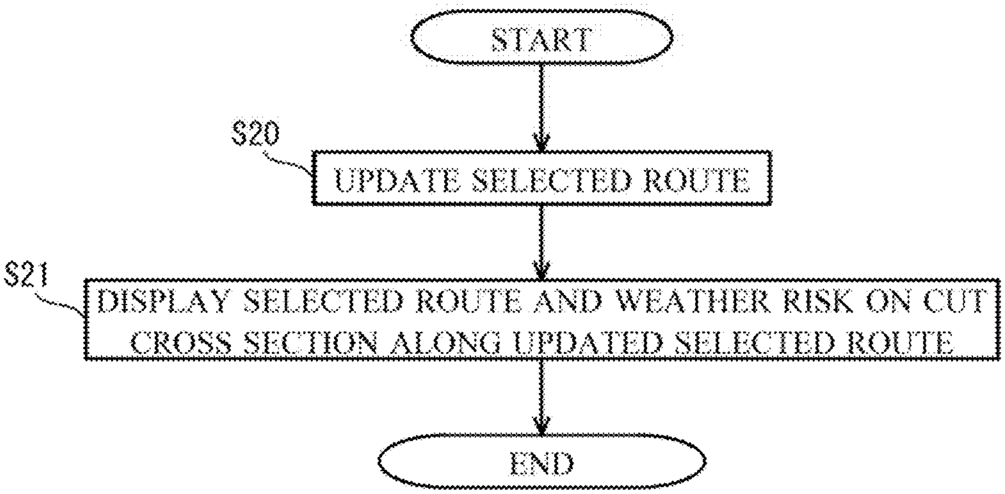
FIG. 1B is a flow showing a cross section update process.

Processes shown in FIGS. 1A and 1B are processes included in the display program for assisting in route determination according to the present embodiment. FIG. 1A is a flow showing a route display process, and FIG. 1B is a flow showing a cross section update process. In particular, the route display process is executed at a time point when a takeoff airport and a landing airport are fixed, and the cross section update process is executed at a time point when a selected route is changed after the end of the route display process.

Figure 2:
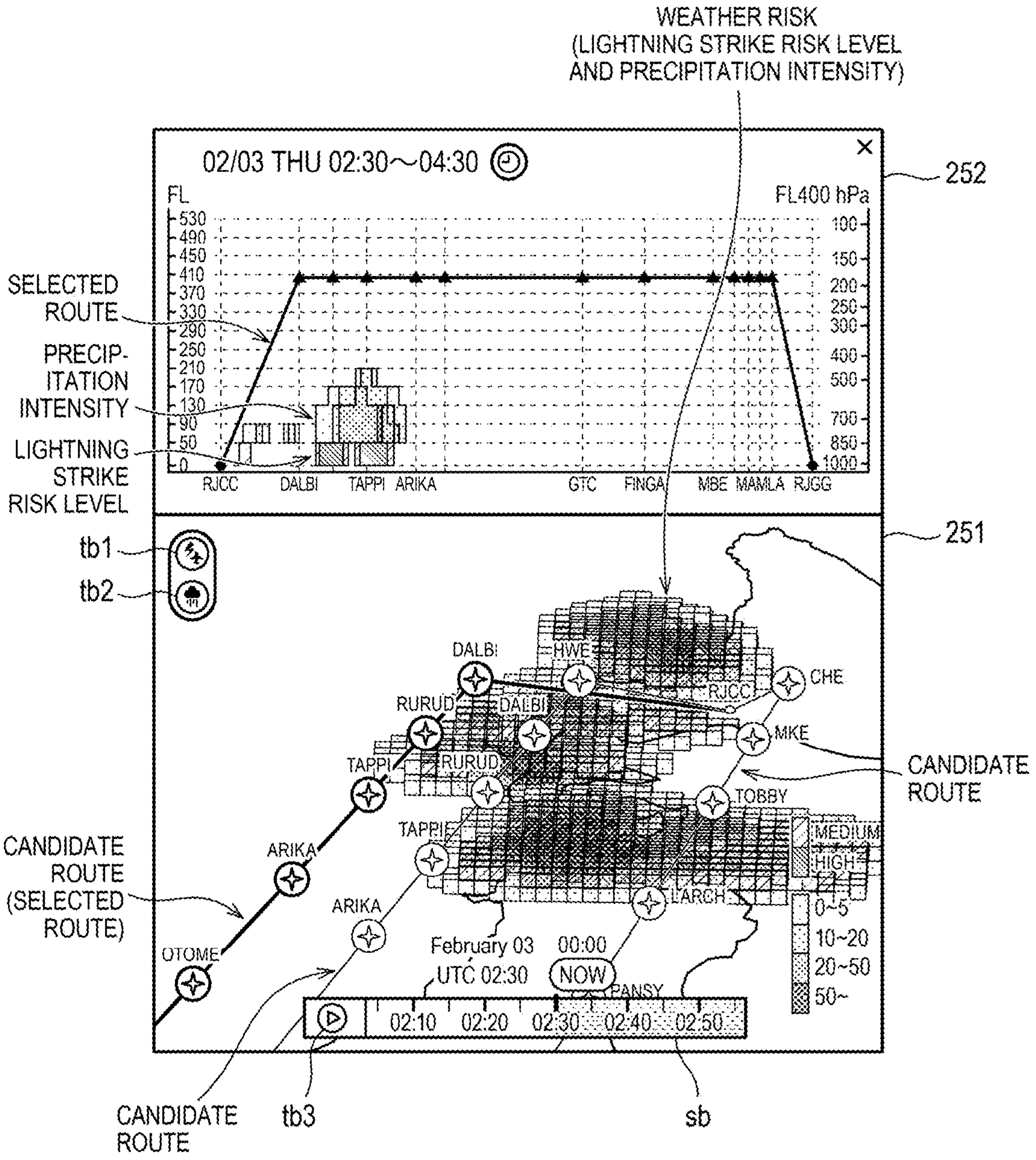
FIG. 2 is an example of an image to be displayed on a display of a route determination assistance device.

FIG. 2 is an example of an image to be displayed on a display (a display 25 shown in FIG. 11) of a route determination assistance device. The route determination assistance device refers to a mobile terminal (a route determination assistance device 10 shown in FIGS. 11 and 12) on which the display program for assisting in route determination is installed. Details, such as a hardware configuration, of the device will be described later.

As shown in FIG. 1A, candidate routes are acquired in step S10 that is a first step of the route display process of displaying a route and a weather risk together.

The candidate route refers to a route which is fixed at a time point when a takeoff airport (takeoff point) and a landing airport (landing point) are fixed. Depending on the fixed takeoff and landing airports, there are basically a plurality of candidate routes. In particular, although the takeoff airport and the landing airport are fixed by an input operation on the route determination assistance device (airport selection on a map) in the present embodiment, the airports may be acquired from a device (an external server or the like) other than the route determination assistance device, such as a weather risk derivation device (to be described later). Additionally, after the takeoff airport and the landing airport are fixed by the above-described methods, a route connecting the airports may be drawn by an input operation on the route determination assistance device or the route may be acquired from the device other than the route determination assistance device.

In step S11, three-dimensional (3D) weather risks are acquired.

A 3D weather risk refers to information in which a distribution with altitude (marked in increments of 100 m) of a weather risk is provided for each of a plurality of regions separated like meshes with latitude lines and longitude lines (both in increments of 0.005 degrees in the present embodiment).

Weather risks in the present embodiment include a lightning strike risk level indicating the level of risk of a lightning strike on an aircraft and a precipitation intensity. In particular, the lightning strike risk level is rated on a two-point scale: medium and high. The precipitation intensity is rated on a four-point scale: 0 to 5 mm/h, 10 to 20 (exclusive) mm/h, 20 (inclusive) to 50 (exclusive) mm/h, and 50 or more mm/h. A navigation-related risk is higher for a level described later both in the lightning strike risk level and in the precipitation intensity.

Although the sizes of the plurality of regions are not particularly limited in the present invention, the plurality of regions are set to have a horizontal size which covers the whole territory of Japan including waters close to Japan in the present embodiment.

Furthermore, although an upper limit of an altitude is also not particularly limited, the upper limit is set to 15000 m in the present embodiment.

In step S12, a default route of the acquired candidate routes is set as a selected route.

Although the default route may be any of the candidate routes, one with a shortest flight range of the candidate routes is preferable.

In step S13, the candidate routes and the weather risks are displayed on a 3D map.

As shown in FIG. 2, the plurality of candidate routes and the weather risks (a lightning strike risk level and a precipitation intensity) are displayed together on the 3D map in a lower display region 251 (a part of a display region on the display of the route determination assistance device). Details of displayed content shown in FIG. 2 including a display on a cut cross section (to be described later) will be described later.

In step S14, the selected route and the weather risks are displayed on a cut cross section cut vertically along the selected route of the 3D map, and the route display process is ended after that.

With this step, as shown in FIG. 2, the selected route and the weather risks are displayed together in the cut cross section displayed in an upper display region 252 (a part of the display region on the display of the route determination assistance device as in the lower display region 251).

Although the above-described cut cross section cut vertically along the route may be one obtained by realistically cutting the atmosphere and the Earth (one with information on projections and depressions on the Earth's surface and curvature of the Earth), the cut cross section is composed of a two-dimensional display of a way (the horizontal axis) on a horizontal plane from a start point and an altitude (the vertical axis) which are drawn on the basis of three-dimensional information of the route in the present embodiment.

Note that a display in the lower display region 251 and a display in the upper display region 252 are not always simultaneously provided as in the present embodiment. Switching between the former display (the display on the 3D map) and the latter display (the display of the cut cross section) in one display region, such as switching from the former display to the latter display, may be performed.

As described above, in the display program for assisting in route determination according to the present embodiment, a route acquisition process of acquiring routes (step S10), a weather risk acquisition process of acquiring weather risks as three-dimensional information (step S11), a first display process of displaying the routes and the weather risks together as a three-dimensional image (step S13), and a second display process of displaying a route concerned and the weather risks together on a cross section cut vertically along the route (step S14) are executed.

Since a relationship between a route and weather risks in the horizontal direction and a relationship between the route and the weather risks in the vertical direction can be separately checked, recognition of a relationship between a route and weather risks can be facilitated. This contributes to setting of a route less impacted by the weather risks.

Note that, to achieve the effect, a display implemented by step S13 may be a two-dimensional (2D) display along the ground (horizontal plane). That is, the first display process may be a process of displaying, in plan view, at least each of routes and weather risks together.

As shown in FIG. 1B, a selected route is updated in step S20 that is a first step of the cross section update process to be executed when a selected route is updated. In the present embodiment, selected route update is implemented by tapping a candidate route other than a currently selected route on a screen.

In step S21, the selected route and the weather risks are displayed on a cut cross section cut vertically along the updated selected route of the 3D map, and the cross section update process is ended after that. With this step, displayed content in the upper display region 252 is updated so as to correspond to the selected route after the update.

As described above, in the display program for assisting in route determination according to the present embodiment, it can be said that the route acquisition process (step S10) acquires a plurality of types of routes which have a takeoff point and a landing point in common, the first display process (step S13) displays, in plan view, at least each of the plurality of types of routes and weather risks together, and that the second display process displays, on a cross section cut vertically along one selected route of the plurality of types of routes, the one route and the weather risks together (step S21).

This facilitates recognition of a relationship between a route and weather risks in selecting one route from a plurality of routes.

<Concerning Details of Display on Display of Route Determination Assistance Device>

Figure 3:
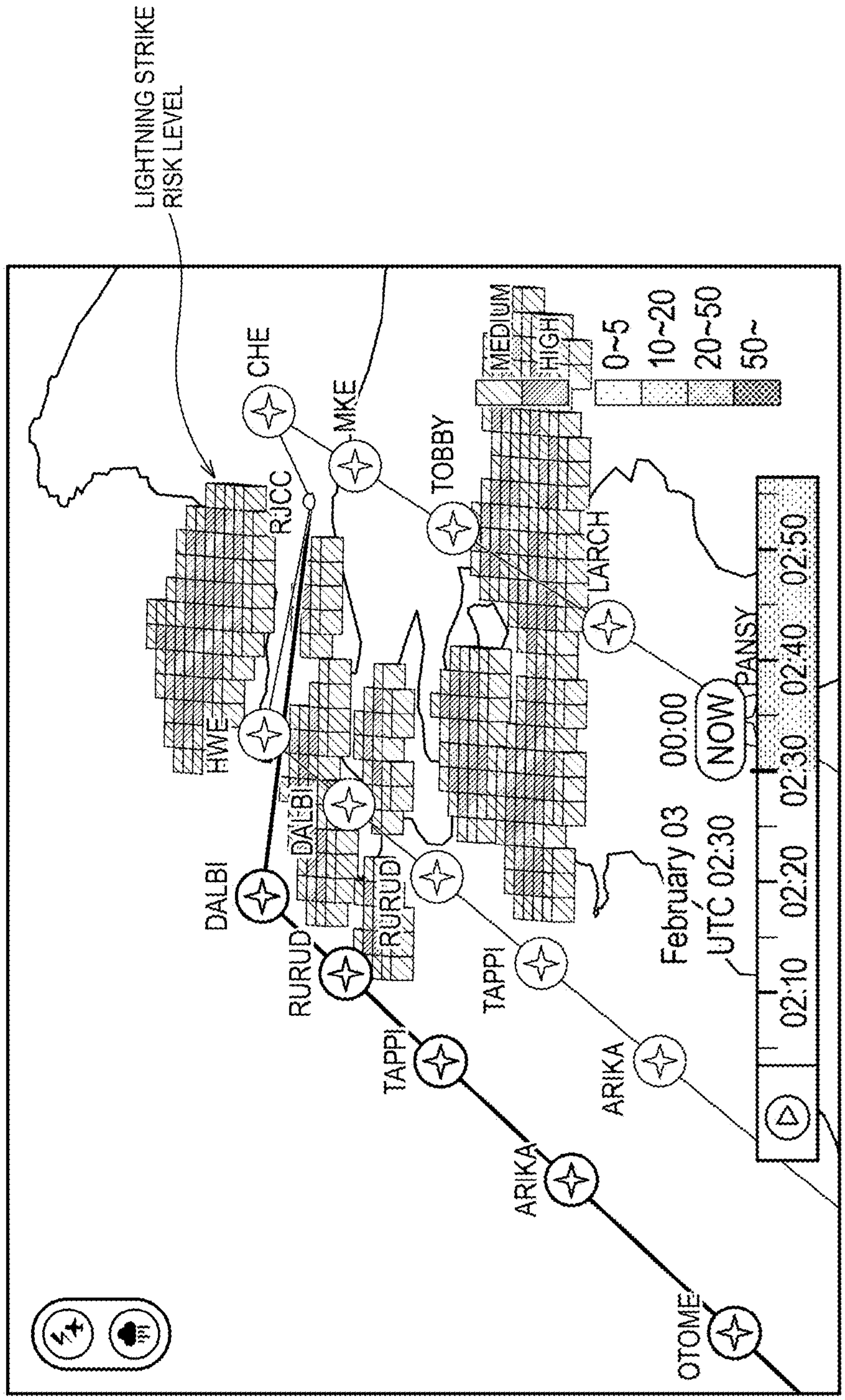
FIG. 3 is a view schematically showing a state in which a precipitation intensity has been removed from weather risks.
Figure 4:
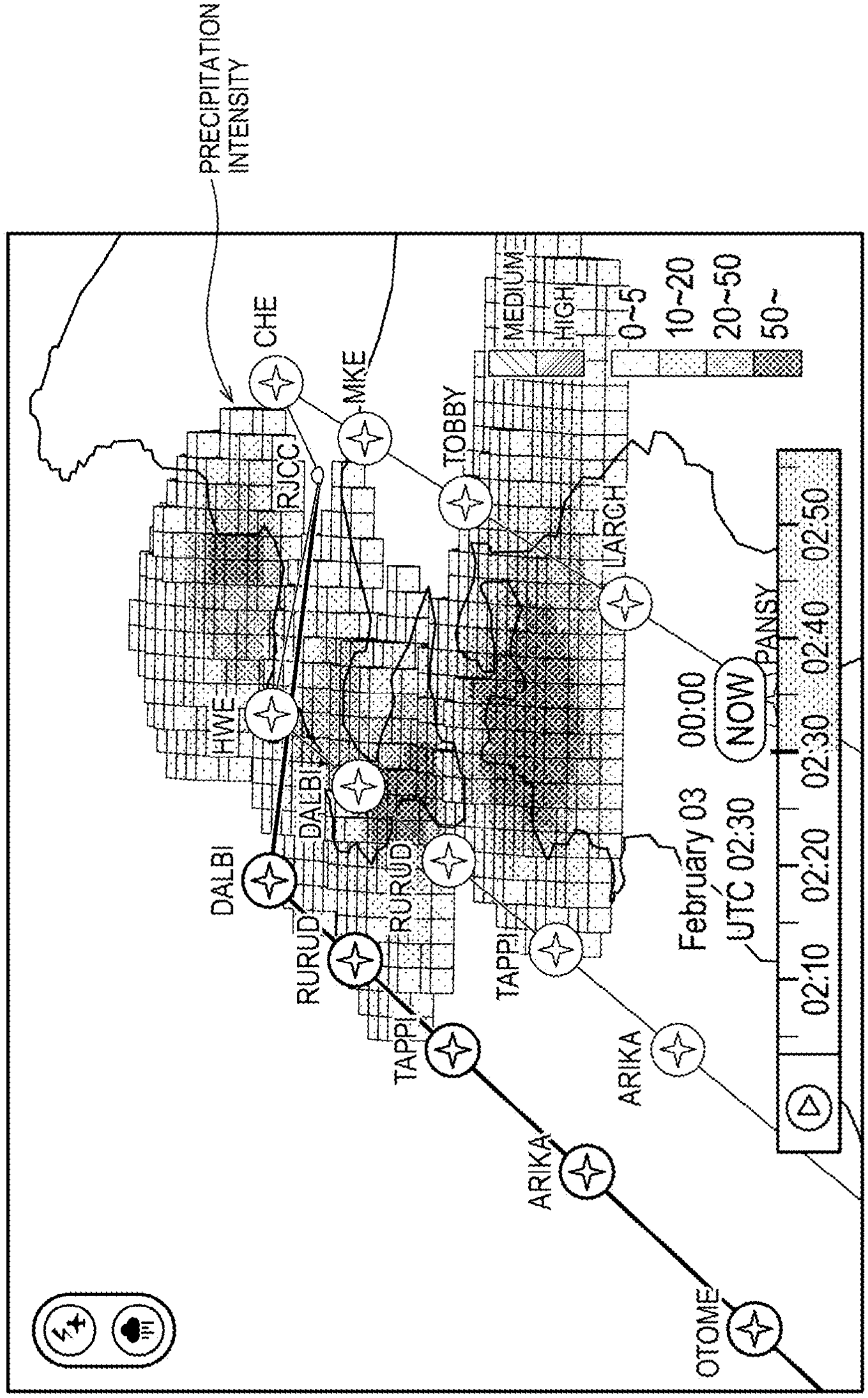
FIG. 4 is a view schematically showing a state in which a lightning strike risk level has been removed from the weather risks.

Details of an image to be displayed on the display of the route determination assistance device by the display program for assisting in route determination according to the present embodiment will be described with reference to FIGS. 3 and 4, in addition to FIG. 2. FIGS. 3 and 4 are each a view schematically showing a state in which some of the weather risks have been removed from a screen to be displayed on the display of the route determination assistance device. FIG. 3 is a view showing a state in which the precipitation intensity of the weather risks has been removed, and FIG. 4 is a view showing a state in which the lightning strike risk level of the weather risks has been removed.

As shown in FIG. 2, by the display program for assisting in route determination according to the present embodiment, a plurality of candidate routes and the plurality of weather risks are displayed together in the lower display region 251, and a selected route and the plurality of weather risks are displayed together in the upper display region 252. These are as described above. Note that the vertical axis on the left side in the upper display region 252 is expressed in Flight Level (FL) and that 1 FL corresponds to 100 feet.

In the lower display region 251 (3D map), the lightning strike risk level and the precipitation intensity overlap with each other, and the weather risks are hard to see in FIG. 2. Thus, if the weather risks are separately displayed for explanatory convenience, the weather risks are as shown in FIGS. 3 and 4.

Specifically, in FIG. 2, the lightning strike risk level is distributed as shown in FIG. 3, and the precipitation intensity is distributed as shown in FIG. 4. As shown in FIGS. 3 and 4, each weather risk is shown such that a cube of a color corresponding to a level is displayed for each unit space, the unit space belonging to the level. Also, in the present embodiment, even if a plurality of weather risks overlap with each other, the weather risks have light permeability. The presence of each weather risk can be identified.

In the present embodiment, a selected route of candidate routes is displayed as a line thicker than the other candidate routes.

A first tap button tb1 and a second tap button tb2 to be tapped for switching between display and hiding of some of the weather risks are provided in the lower display region 251. Although not shown in the drawings, when the first tap button tb1 is tapped, a line of an outer frame of the displayed button is hidden, and the lightning strike risk level is hidden.

Similarly, when the second tap button tb2 is tapped, a line of an outer frame of the displayed button is hidden, and the precipitation intensity is hidden in the lower display region 251 and the upper display region 252.

When the first tap button tb1 is tapped in a state where the lightning strike risk level is hidden, the lightning strike risk level is displayed again in the lower display region 251 and the upper display region 252. Similarly, when the second tap button tb2 is tapped in a state where the precipitation intensity is hidden, the precipitation intensity is displayed again in the lower display region 251 and the upper display region 252.

Note that some or all of the tap buttons may not be provided on the display region of the display of the route determination assistance device and may be implemented by a physical button or physical buttons (various buttons 31 shown in FIG. 11 or the like) provided in the route determination assistance device.

In the lower display region 251, a scroll bar sb with the past and the future with reference to the current date and time (2:30 a.m. on February 3 Coordinated Universal Time (UTC) in this example) graduated in increments of 5 minutes is displayed, and a third tap button tb3 for executing a navigation reproduction process (to be described later) is displayed.

In the scroll bar sb, a region corresponding to past times and a region corresponding to future times are displayed with reference to the current time using different colors.

Although not shown in the drawings, in the present embodiment, the weather risks at a time falling on a center of the scroll bar sb (a position of a marking indicated by a thick line) can be displayed by dragging the scroll bar sb to the left and right (for example, 2:30 is located at the position of the marking indicated by the thick line in FIG. 2). More specifically, past weather risks (track records) can be displayed by dragging the scroll bar sb to the right side, and future weather risks (predictions) can be displayed by dragging the scroll bar sb to the left side.

In the present embodiment, a viewpoint of an image to be displayed in the lower display region 251 can be rotated or moved by dragging a region irrelevant to the above-described operations (the first tap button tb1, the second tap button tb2, the scroll bar sb, and candidate routes) of the lower display region 251. Although details will be described later, rotation of the viewpoint may trigger a display switching process (to be described later).

As described above, in the display in the lower display region 251, that is, on the 3D map, a plurality of weather risks can overlap. In the display in the upper display region 252, one of a plurality of weather risks is displayed in a region where the weather risks overlap.

Specifically, in step S14 and step S21 described above, in a region where the lightning strike risk level and the precipitation intensity overlap, the configuration is such that the precipitation intensity is not displayed and such that the lightning strike risk level is displayed.

This facilitates recognition of a relationship between a route and weather risks in selecting one route from a plurality of routes.

Note that, to achieve the effect, in a region where the plurality of weather risks overlap of the upper display region 252, one of the weather risks is displayed as a light-impermeable image and that the other weather risk(s) may be displayed as a light-permeable image in front of the one image. That is, in the region where the plurality of weather risks overlap of the upper display region 252, one of the weather risks may be displayed while being given priority over the other weather risk(s). In particular, one which is of high importance (is high) in aircraft navigation is preferably adopted as a weather risk to be preferentially displayed.

As shown in FIG. 2, every candidate route connects so-called waypoints (points indicated by circled stars in the lower display region 251 and points indicated by black triangles in the upper display region 252). Although a flow and the like are not shown in the drawings, in the display program for assisting in route determination according to the present embodiment, an altitude of a selected route can be adjusted by individually dragging a waypoint shown in the upper display region 252 up and down.

This allows avoidance of a weather risk which cannot be avoided only by selection of a candidate route.

When altitude adjustment of a selected route is performed in the upper display region 252, a result of the altitude adjustment is reflected in the selected route in the lower display region 251, and an altitude of the route on the 3D map is also updated.

Only waypoints are points on a candidate route whose altitude can be adjusted in the present embodiment. In addition to or instead of this, different points may be provided. For example, more different points may be distributed in an area with a high weather risk than in an area with a low weather risk.

<Concerning Process of Switching Some of 3D Weather Risks to 2D Display>

As described above, the configuration is such that a plurality of 3D weather risks can be displayed in the lower display region 251. To facilitate individual visual recognition of the weather risks, the display program for assisting in route determination according to the present embodiment is configured to be capable of executing a process of switching some of weather risks displayed in 3D to a 2D display. Details of the function will be described below with reference to FIGS. 5 and 6.

Figure 5:
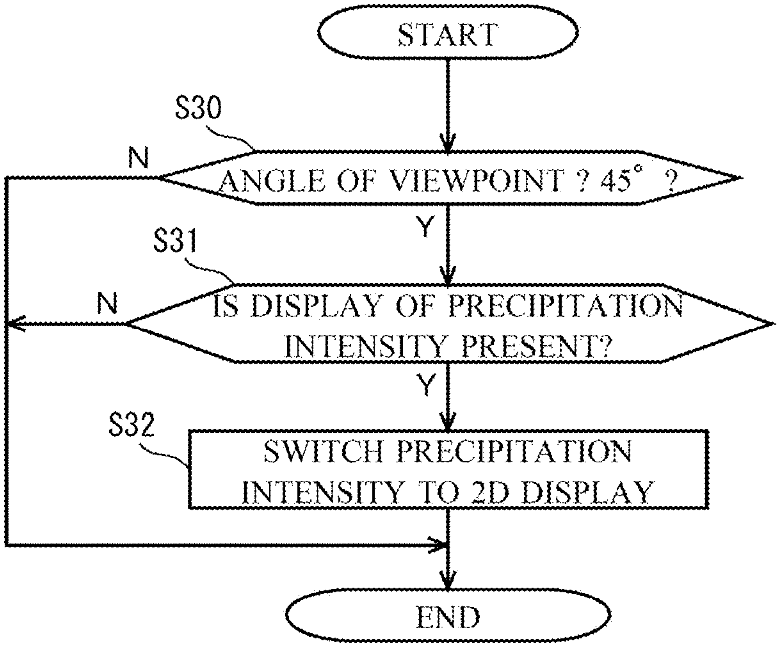
FIG. 5 is a flow showing a display switching process.
Figure 6:
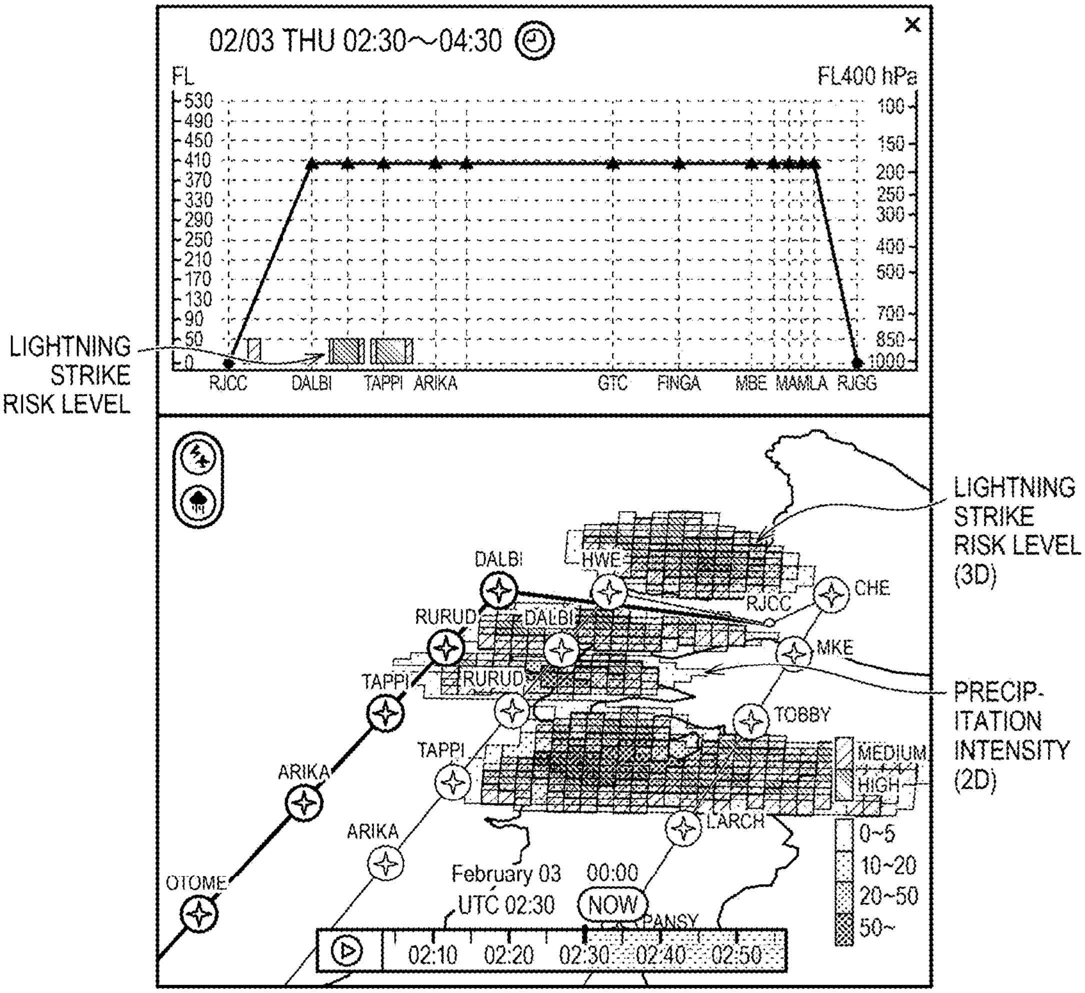
FIG. 6 is an example of an image to be displayed on the display of the route determination assistance device after some weather risks are switched to a 2D display.

FIG. 5 is a flow showing the display switching process, and FIG. 6 is an example of an image to be displayed on the display of the route determination assistance device after some of the weather risks are switched to a 2D display.

As shown in FIG. 5, it is judged in step S30 that is a first step of the display switching process of switching some of weather risks displayed in 3D to a 2D display whether an angle of a viewpoint is equal to or more than 45° in the lower display region 251. If the condition is satisfied, an advance is made to step S31. If the condition is not satisfied, the display switching process is ended. The angle of the viewpoint here refers to a sharp angle of angles defined by a line virtually drawn from the viewpoint toward a center of the lower display region 251 and the ground (horizontal plane).

In step S31, it is judged whether the precipitation intensity (3D) is displayed in the lower display region 251. If the condition is satisfied, an advance is made to step S32. If the condition is not satisfied, the display switching process is ended.

In step S32, the precipitation intensity in 3D is switched to a 2D display (a two-dimensional view on the Earth's surface), and the display switching process is ended after that.

Specifically, as shown in FIG. 6, when the process in step S32 is executed, the precipitation intensity of the weather risks is switched from a 3D display to a 2D display in the lower display region 251, and the precipitation intensity is hidden in the upper display region 252. That is, only the weather risks except the weather risk switched from a 3D display to a 2D display in the lower display region 251 is displayed in the upper display region 252. Note that switching a weather risk from a 3D display to a 2D display in the present embodiment refers to integrating a distribution with altitude (a value per 100 m) of a weather risk as a switching object in the vertical direction for each of a plurality of regions and changing each region to a display mode (a color, for example) corresponding to the integrated value. However, in switching the weather risk from a 3D display to a 2D display, a different value corresponding to the integrated value (an hourly precipitation, for example, if the weather risk as the object is the precipitation intensity) may be adopted instead of the integrated value.

This facilitates route selection with a weather risk which is kept displayed in 3D in the lower display region 251 in mind.

Note that, to achieve the effect, a trigger for the process in step S32 is not limited to one according to the present embodiment, such as a tap of a dedicated tap button, and that a variety of triggers for execution may be adopted. Here, adoption of the trigger for execution according to the present embodiment facilitates checking of the presence of a plurality of weather risks in a state with a large angle of the viewpoint where the plurality of weather risks are unlikely to be seen stereoscopically.

One which is of low importance (low) in aircraft navigation is preferably adopted as a weather risk to be switched from a 3D display to a 2D display.

<Concerning Navigation Reproduction Process>

Details of the navigation reproduction process will be described with reference to FIGS. 7 to 10.

Figure 7:
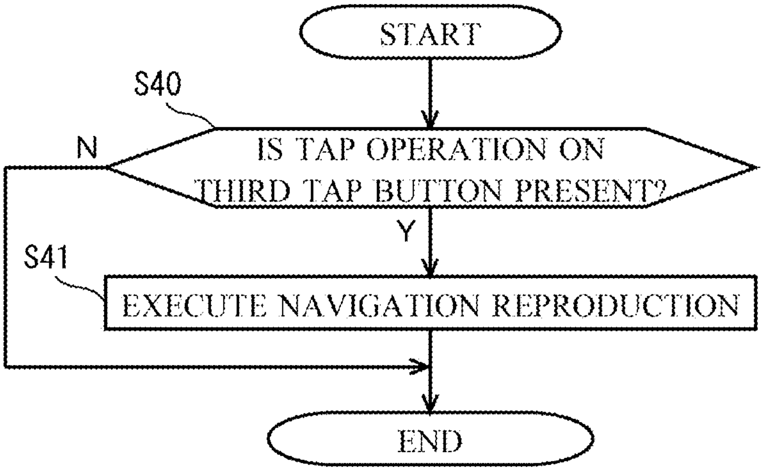
FIG. 7 is a flow of a navigation reproduction process.
Figure 8:
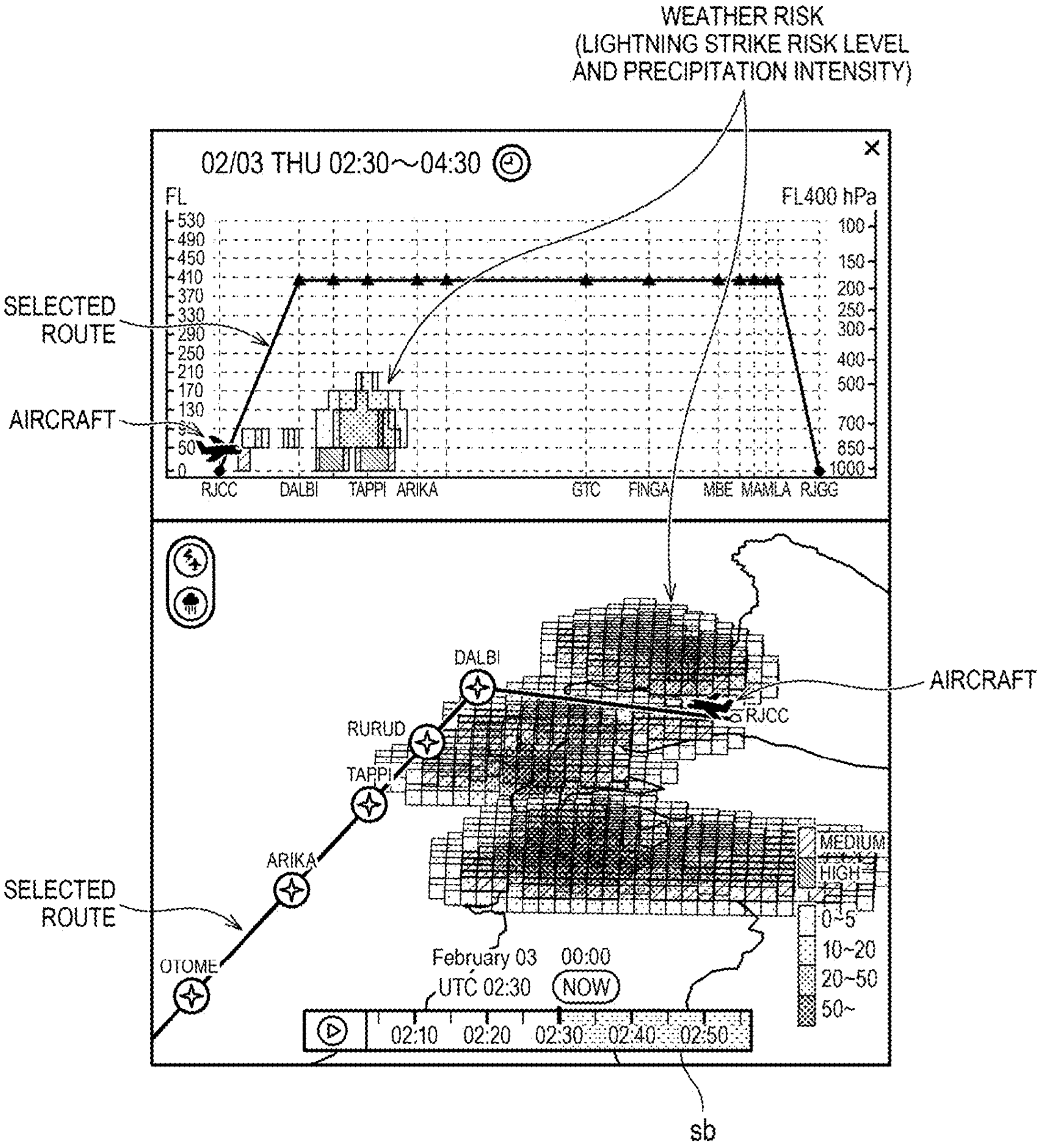
FIG. 8 is a view showing a display example during navigation reproduction.
Figure 9:
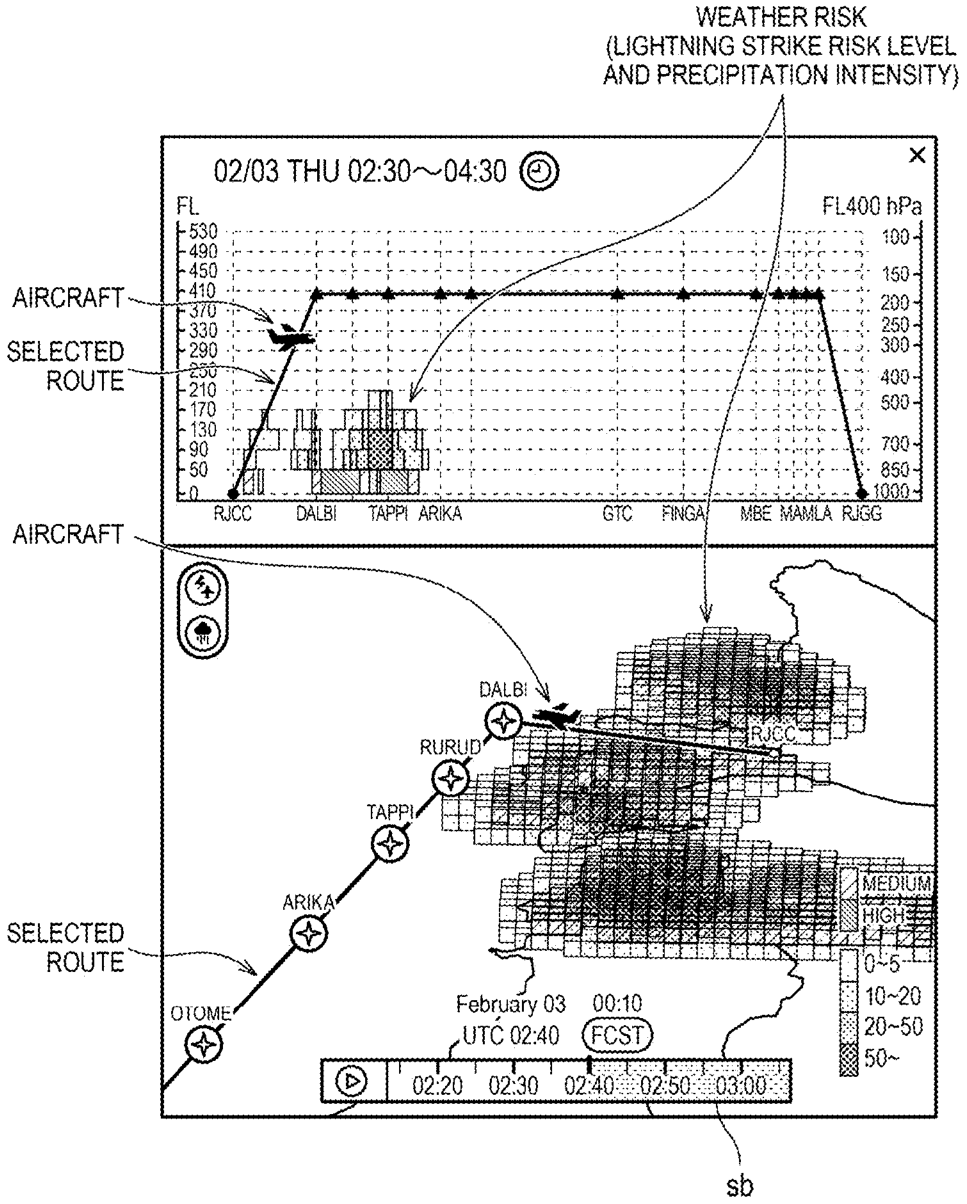
FIG. 9 is a view showing a display example during the navigation reproduction continued from FIG. 8.
Figure 10:
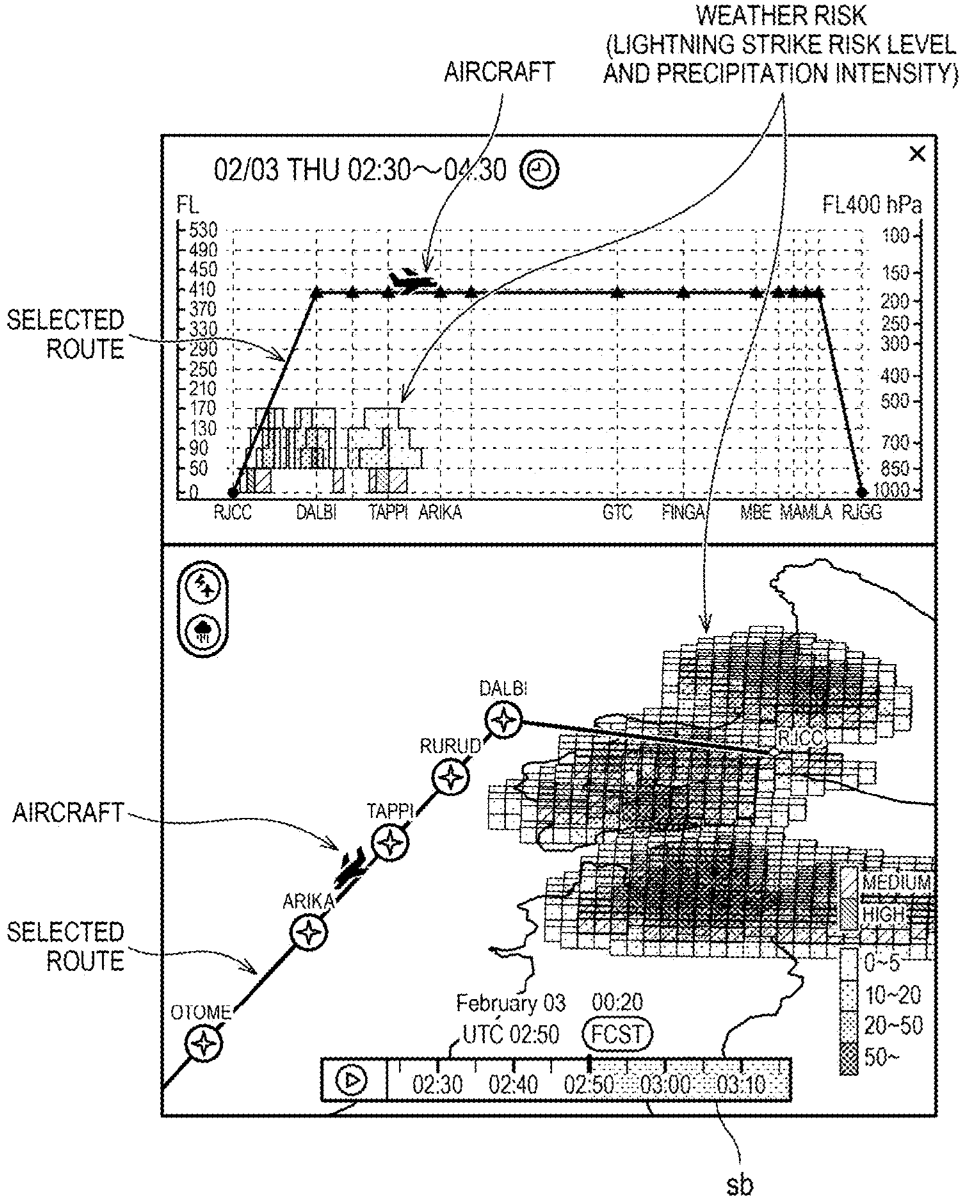
FIG. 10 is a view showing a display example during the navigation reproduction continued from FIG. 9.

FIG. 7 is a flow of the navigation reproduction process, and FIGS. 8 to 10 are views showing display examples during navigation reproduction.

As shown in FIG. 7, it is judged in step S40 that is a first step of the navigation reproduction process whether the third tap button tb3 is tapped. If the condition is satisfied, an advance is made to step S41. If the condition is not satisfied, the navigation reproduction process is ended.

In step S41, navigation reproduction is executed, and the navigation reproduction process is ended after that.

The navigation reproduction here refers to navigating (moving) an aircraft on a selected route in the lower display region 251 and the upper display region 252 and displaying a result of predicting the weather risks along with the movement, as shown in FIGS. 8 to 10.

More specifically, in FIG. 8, a position (the New Chitose Airport (RJCC) that is a takeoff airport) of the aircraft at 2:30 a.m. (Coordinated Universal Time (UTC)) that is a start time (the current time) of navigation reproduction and the weather risks (the lightning strike risk level and the precipitation intensity) at the time are displayed both in the lower display region 251 and in the upper display region 252. In this example, a state at the start of the navigation reproduction is illustrated, and an elapsed time displayed above the letters "NOW" is "00:00."

In FIG. 9, the position of the aircraft at 2:40 a.m. that is a time 10 minutes after that and a result of predicting the weather risks at the time are displayed both in the lower display region 251 and in the upper display region 252. In this example, a state after a lapse of 10 minutes since the start of the navigation reproduction is illustrated, and "00:10" is displayed as the elapsed time above the letters "FCST" (an abbreviation for Forecast).

In FIG. 10, the position of the aircraft at 2:50 a.m. that is a time 10 more minutes after that and a result of predicting the weather risks at the time are displayed both in the lower display region 251 and in the upper display region 252. In this example, a state after a lapse of 20 minutes since the start of the navigation reproduction is illustrated, and "00:20" is displayed as the elapsed time above the letters "FCST."

In the navigation reproduction process, a time point when the third tap button tb3 is tapped is used as a start time point and that a time falling on the center of the scroll bar sb is set to the start time point. For this reason, the start time of the navigation reproduction can be changed by dragging the scroll bar sb before tapping the third tap button tb3.

In the present embodiment, the reproduction process is executed using the current time as a reference (the start time point) if the third tap button tb3 is tapped in a state where the scroll bar sb is dragged to the left side and the weather risks in the past are displayed.

As described above, in the display program for assisting in route determination according to the present embodiment, execution of the navigation reproduction process causes navigation of an aircraft on a selected route in the lower display region 251 and the upper display region 252 and causes display of a result of predicting the weather risks along with the movement.

This facilitates visual recognition of a navigation position with impact of weather risks and route selection with the reduced weather risks.

<Concerning Hardware Configuration of Route Determination Assistance Device>

A hardware configuration of the route determination assistance device having the above-described display program for assisting in route determination will be described with reference to FIG. 11.

Figure 11:
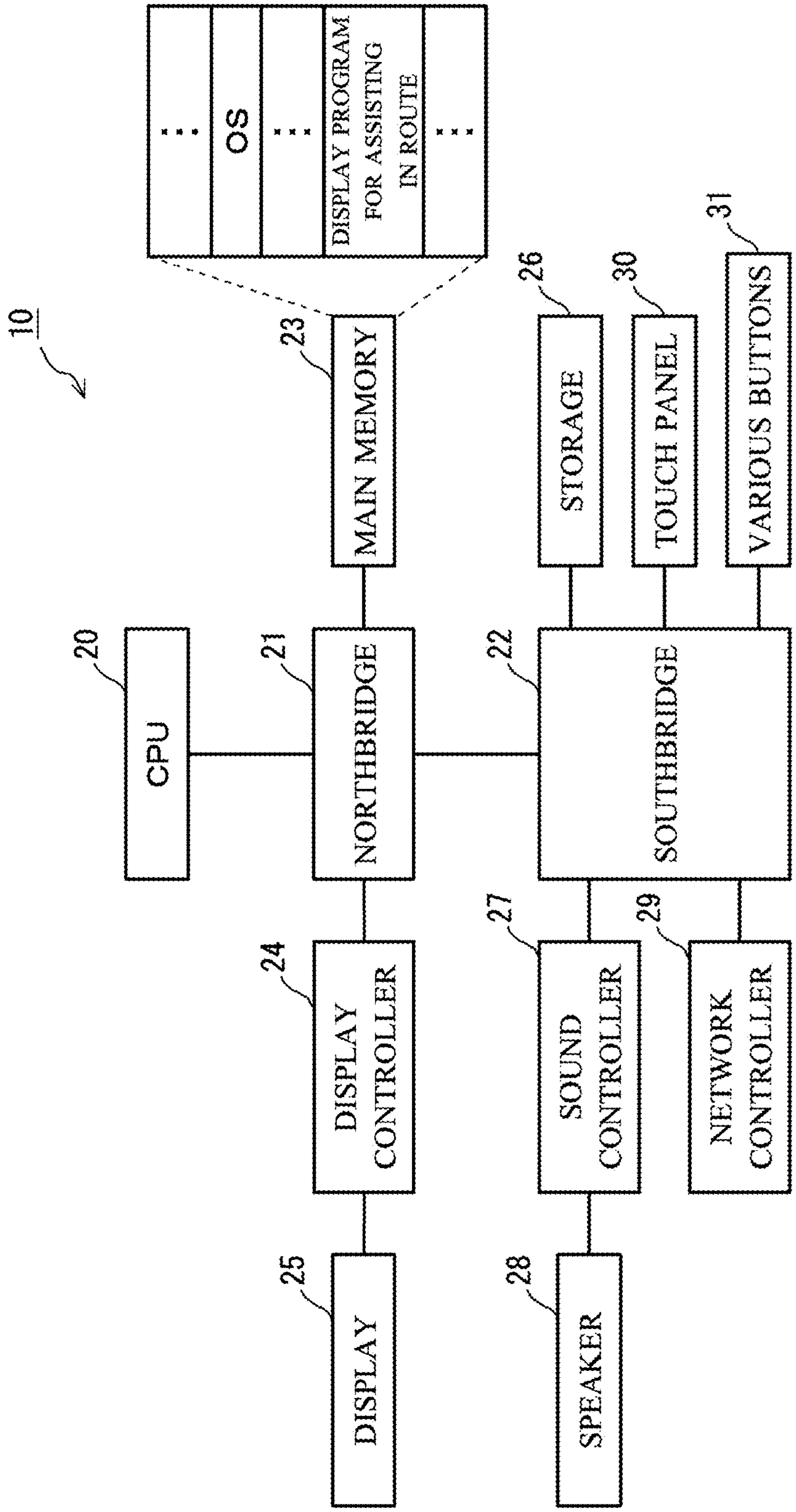
FIG. 11 is a block diagram of the route determination assistance device.

FIG. 11 is a block diagram of the route determination assistance device.

As shown in FIG. 11, the route determination assistance device 10 according to the present embodiment includes a Central Processing Unit (CPU) 20, a northbridge 21, a southbridge 22, a main memory 23, a display controller 24, the display 25, a storage 26, a sound controller 27, a speaker 28, a network controller 29, a touch panel 30, and the various buttons 31. The constituent elements in FIG. 11 are connected via a bus. That is, the route determination assistance device 10 is a computer including a memory and a processor, but the route determination assistance device 10 may be a mobile terminal, such as a tablet, or a stationary personal computer.

The CPU 20 is a processor which is provided to control operation of the computer. The CPU 20 executes various programs, such as an operating system (OS) and the above-described display program for assisting in route determination, which are loaded from the storage 26 into the main memory 23.

The northbridge 21 is connected to the CPU 20, the main memory 23, the display controller 24, and the southbridge 22. The northbridge 21 controls the timing and the speed of data transfer, and the like. The northbridge 21 serves as a data bridge with devices operating at high speed. The northbridge 21 incorporates a memory controller (not shown in the drawings) which performs access control on the main memory 23. The northbridge 21 also has a function of executing communication with the display controller 24 via a Peripheral Component Interconnect Express (PCIe) bus or the like.

The main memory 23 is composed of, for example, a Dynamic Random Access Memory (DRAM). The main memory 23 is used as a work region for the CPU 20. The main memory 23 stores various programs, such as the operating system (OS) and the display program for assisting in route determination, that are loaded from the storage 26.

The display controller 24 controls the display 25. The display controller 24 transmits a video signal to the display 25. The display 25 is composed of a Liquid Crystal Display (LCD) or the like.

The southbridge 22 is connected to the storage 26, the sound controller 27, the network controller 29, the touch panel 30, and the various buttons 31. The southbridge 22 controls the timing and the speed of data transfer and the like. The southbridge 22 serves as a data bridge with devices operating at lower speed than those for the northbridge 21. The southbridge 22 incorporates a memory controller which controls the storage 26.

The storage 26 is a non-volatile storage device. The storage 26 stores in a non-volatile manner various programs, such as the OS and the display program for assisting in route determination.

The sound controller 27 is a sound source device and outputs a sound signal as a reproduction object to the speaker 28.

The network controller 29 includes a controller which executes wireless communication via an external network, such as the Internet. This allows the route determination assistance device 10 to implement exchange of information with a weather risk derivation device (to be described later). Note that the network controller 29 may be configured as a device for connection to a wired network and may implement exchange of information with the weather risk derivation device by wire.

The touch panel 30 and the various buttons 31 are input devices for inputting data to the route determination assistance device 10 and instructing the route determination assistance device 10 to execute processing.

The route determination assistance device 10 includes a route acquisition unit which executes the processes shown in steps $10, $20 (see FIGS. 1A and 1B) and the like, a weather risk processing unit which executes the process shown in step S11 (see FIG. 1A) and the like, a first display processing unit which executes the process shown in step S13 (see FIG. 1A) and the like, a second display processing unit which executes the processes shown in steps S14, S21 (see FIGS. 1A and 1B) and the like, an altitude adjustment processing unit which executes a process related to selected route altitude adjustment (see FIG. 2) and the like, a navigation reproduction processing unit which executes the processes shown in steps S40, S41 (see FIG. 7) and the like, an alert processing unit which executes processes shown in steps S52 to S54 (see FIG. 13) and the like, and a telegram generation processing unit which executes a process shown in step S51 and the like. A program for the processes to be executed by these processing units is stored in the main memory 23. The CPU 20 loads the program stored in the main memory 23, thereby implementing the processing units.

<Concerning Outline of Route Determination Assistance System>

An outline of a route determination assistance system including the above-described route determination assistance device will be described with reference to FIG. 12.

Figure 12:
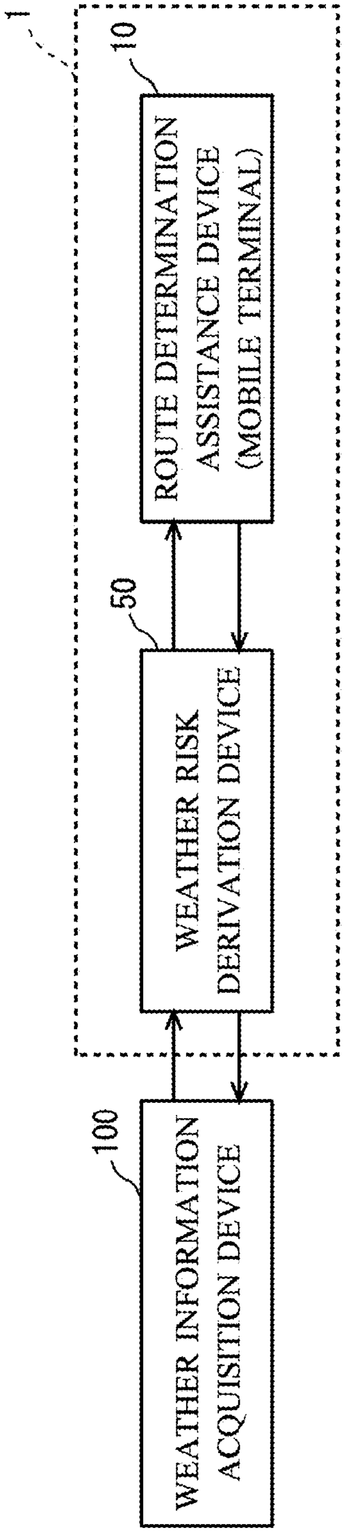
FIG. 12 is a block diagram showing an outline of a route determination assistance system.

FIG. 12 is a block diagram showing the outline of the route determination assistance system.

As shown in FIG. 12, a route determination assistance system 1 according to the present embodiment is composed of the route determination assistance device 10 and a weather risk derivation device 50. The weather risk derivation device 50 derives past, current, and future (predicted) weather risks from weather information acquired from a weather information acquisition device 100, and transmits the weather risks to the route determination assistance device 10 as needed.

For example, the AMeDAS, weather radars, such as a C-band radar within the jurisdiction of the Japan Meteorological Agency which applies a single radio wave in the C-band toward the atmosphere and observes the intensity of a wave reflected from the atmosphere (hereinafter referred to as an echo intensity), weather models, such as an MSM weather model, and nowcasts within the jurisdiction of the Japan Meteorological Agency are included in the weather information acquisition device 100, and appropriate components are adopted in accordance with details of weather risks derived by the weather risk derivation device 50.

The weather risk derivation device 50 derives current weather risks using weather information transmitted from the weather information acquisition device 100, predicts future weather risks, and saves past weather risks.

For example, in the present embodiment, the weather risk derivation device 50 derives the above-described lightning strike risk level from an echo intensity (one observed by a weather radar or the like) and a distribution with altitude of air temperature (one derived from a weather model) which are transmitted from the weather information acquisition device 100. The above-described precipitation intensity corresponds to the echo intensity.

Note that a lightning strike risk level named as a weather risk derived by the weather risk derivation device 50 according to the present embodiment is a weather risk to be taken into consideration in order to avoid a risk of a lightning strike on an aircraft, and a precipitation intensity is a weather risk to be taken into consideration in order to avoid icing which may occur during navigation.

In addition to the ones given in the description of the present embodiment, any indicator, such as a turbulent airflow, an airflow, or volcanic ash, may be adopted as a weather risk adopted in the present embodiment as long as the indicator may be a risk in navigation. Any number of weather risks may be adopted.

<Concerning Alert Process>

An alert process of providing a warning display is also included in the above-described display program for assisting in route determination. Details of the process will be described below with reference to FIG. 13.

Figure 13:
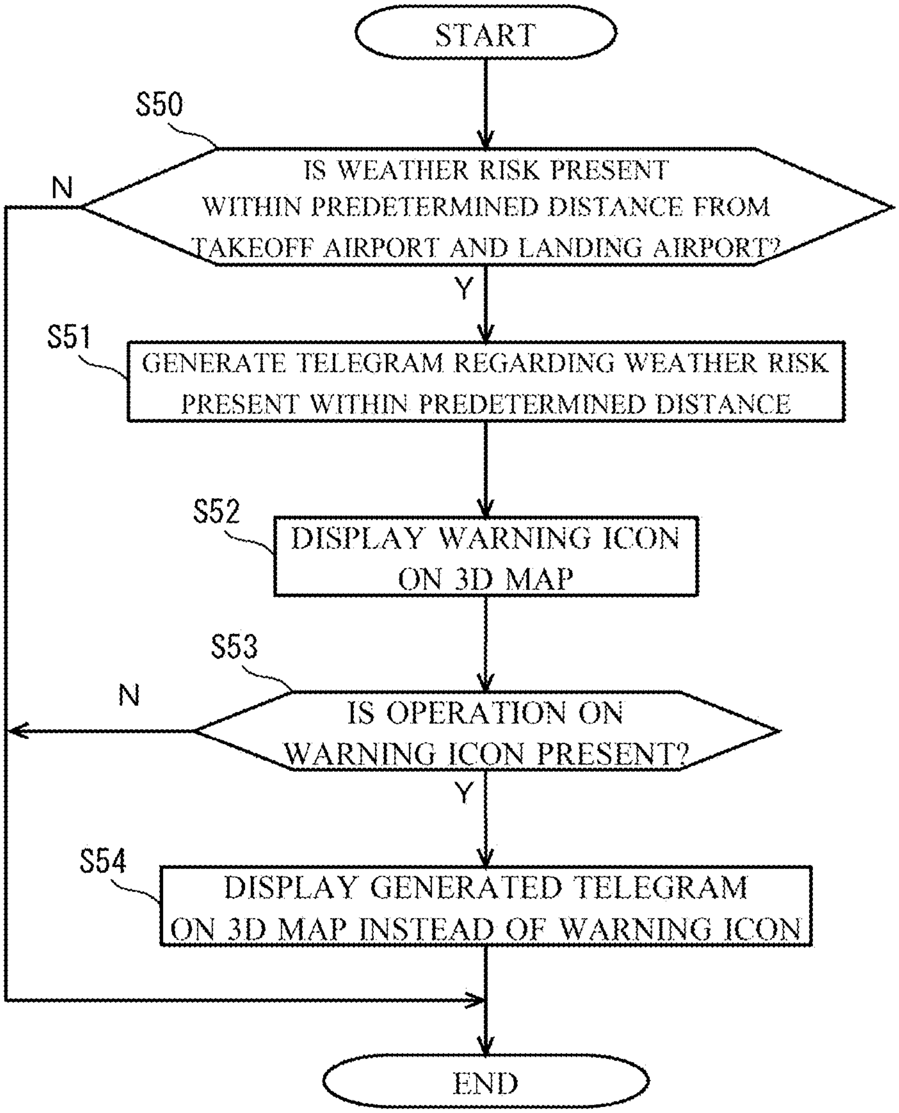
FIG. 13 is a flow showing an alert process.

FIG. 13 is a flow showing the alert process and that the process is executed after the route display process is ended and is executed each time a predetermined condition is satisfied after that. In particular, the predetermined condition refers to a requirement that a weather risk be updated and a requirement that a weather risk as a display object be changed by operation of the scroll bar sb.

As shown in FIG. 13, it is judged in step S50 that is a first step of the alert process whether a lightning strike risk level (which refers to a lightning strike risk level being displayed and includes not only a lightning strike risk level of high but also a lightning strike risk level of medium) is present within a predetermined distance (50 km in the present embodiment) from a takeoff airport or a landing airport. If the condition is satisfied, an advance is made to step S51. If the condition is not satisfied, the alert process is ended.

Although a shortest distance as viewed in the horizontal direction is adopted here as a distance between an airport and a lightning strike risk level to be compared with the predetermined distance in the judgment, a shortest distance as viewed three-dimensionally may be adopted.

Additionally, the predetermined distance is not limited to 50 km and may be appropriately changed on the basis of external factors, such as the climate and the seasons of a district where the display program for assisting in route determination is used, and the type (size, shape, and the like) of an aircraft.

In step S51, a telegram regarding the lightning strike risk level present within the predetermined distance is generated.

More specifically, if a lightning strike risk level is present within the predetermined distance from the takeoff airport, and a lightning strike risk level is not present within the predetermined distance from the landing airport, a telegram corresponding to the takeoff airport is generated. If a lightning strike risk level is present within the predetermined distance from the landing airport, and a lightning strike risk level is not present within the predetermined distance from the takeoff airport, a telegram corresponding to the landing airport is generated. Furthermore, if a lightning strike risk level is present within the predetermined distance from the takeoff airport, and a lightning strike risk level is present within the predetermined distance from the landing airport, both a telegram corresponding to the takeoff airport and a telegram corresponding to the landing airport are generated.

A telegram here is composed of text data and can be transmitted to an object aircraft (an aircraft navigating on a route being displayed) through the Aircraft Communications Addressing and Reporting System (ACARS). In particular, a telegram regarding a lightning strike risk level present within the predetermined distance in the present embodiment includes information (which may be information allowing identification of a point near an object airport (the takeoff airport or the landing airport) present within the predetermined distance from the lightning strike risk level) which allows identification of the object airport, information which allows identification of a time (UTC) when the lightning strike risk level is present, and information which allows identification of a position (a latitude and a longitude) of a unit space located at a closest position as viewed in the horizontal direction to the object airport of unit spaces in which the lightning strike risk level is present. Note that the position of the unit space is not limited to the latitude and the longitude and may be replaced with a direction with respect to the object airport and a distance in the horizontal direction. Information included in the telegram is not limited to the above-described pieces of information. Any information may be adopted as long as the information is information regarding the lightning strike risk level present within the predetermined distance, such as one including an altitude range of a lightning strike risk level present at the position of the unit space.

In step S52, a warning icon is displayed on the 3D map.

Although not shown in the drawings, a warning icon is composed of an image which represents lightning and is displayed in the vicinity of an airport which is present within the predetermined distance from a lightning strike risk level.

More specifically, if a lightning strike risk level is present within the predetermined distance from the takeoff airport, and a lightning strike risk level is not present within the predetermined distance from the landing airport, a warning icon is displayed only in the vicinity of the takeoff airport. If a lightning strike risk level is present within the predetermined distance from the landing airport, and a lightning strike risk level is not present within the predetermined distance from the takeoff airport, a warning icon is displayed only in the vicinity of the landing airport. If a lightning strike risk level is present within the predetermined distance from the takeoff airport, and a lightning strike risk level is present within the predetermined distance from the landing airport, respective warning icons are displayed in the vicinity of the takeoff airport and in the vicinity of the landing airport. The same applies to a case of displaying a telegram (details will be described later).

In step S53, it is judged whether a tap operation is performed on the warning icon. If the condition is satisfied, an advance is made to step S54. If the condition is not satisfied, the alert process is ended. In step S54, the telegram regarding the lightning strike risk level generated in step S51 is displayed on the 3D map instead of the warning icon, on which the tap operation is performed, and the alert process is ended after that.

As described above, in the display program for assisting in route determination according to the present embodiment, display of a warning (display of a warning icon or display of a telegram) through execution of the alert process allows a visual grasp of whether a lightning strike risk level is present near an airport (a takeoff airport or a landing airport) constituting a route being displayed.

As described above, generation of a telegram regarding a lightning strike risk level present within a predetermined distance makes it possible to transmit information regarding the lightning strike risk level present within the predetermined distance from an airport constituting a route being displayed to an object aircraft through the ACARS even if the route determination assistance device cannot be brought onto a plane for security and other reasons. Thus, a person on the aircraft, such as a pilot, can grasp whether a lightning strike risk is present on the route during navigation.

In particular, to send a generated telegram to the object aircraft through the ACARS, a tap button which copies text of the telegram when being tapped may be provided near the displayed telegram. This configuration makes it possible to paste the telegram on an input screen related to the ACARS to do accurate input.

Note that although a lightning strike risk level is named as an object of the alert process in the present embodiment, a different weather risk, such as a precipitation intensity, may be set as the object of the alert process in addition to or instead of this.

Furthermore, it is assumed that a plurality of risk levels are provided for a weather risk as the object of the alert process, like a lightning strike risk level including a lightning strike risk level of high and a lightning strike risk level of medium in the present embodiment. In this case, the alert process may be executed without any distinction between risk levels as in the alert process according to the present embodiment or the alert process may be executed only for a highest risk level.

Although both a takeoff airport and a landing airport are set as objects of the alert process according to the present embodiment, the alert process may be executed on only either one of the airports.

Although the alert process is configured to display a telegram regarding a lightning strike risk level present within the predetermined distance instead of a warning icon, the alert process is not limited to this. For example, if a tap operation is performed on the warning icon, the warning icon and the telegram may be displayed in parallel or the telegram may be displayed from the beginning without displaying the warning icon.

Although a warning icon and a telegram regarding a lightning strike risk level present within the predetermined distance are displayed on a 3D map in the alert process, at least either one of the displays may be displayed on a cut cross section (see upper screens in FIGS. 2 and 6) cut vertically along a route in addition to or instead of this.

The above description is illustrative of the present invention, and diverse configurations other than the above one can be adopted. The above-described configurations can be appropriately combined without departing from the spirit of the present invention.

The present embodiment includes the following technical ideas.

(1)

A display program for assisting in determining an aircraft route, the program executing a route acquisition process of acquiring a route, a weather risk acquisition process of acquiring a weather risk as three-dimensional information, a first display process of displaying, in plan view, at least each of the route and the weather risk together, and a second display process of displaying the route and the weather risk together on a cross section cut vertically along the route.

(2)

The display program for assisting in determining the aircraft route according to (1) above, wherein the route acquisition process acquires a plurality of types of routes which have a takeoff point and a landing point in common, the first display process displays, in plan view, at least each of the plurality of types of routes and the weather risk together, and the second display process displays, on a cross section cut vertically along one route selected from the plurality of types of routes, the one route and the weather risk together.

(3)

The display program for assisting in determining the aircraft route according to (2) above, wherein the weather risk acquisition process acquires a plurality of types of the weather risks, the first display process displays the plurality of types of routes and the plurality of types of weather risks together as a three-dimensional image, and the second display process displays, on a cross section cut vertically along one route selected from the plurality of types of routes, the one route and the plurality of types of weather risks together, and displays, in a region where different types of the weather risks overlap of a region of the cross section, one of the overlapping weather risks while giving priority to the one weather risk over the other weather risks.

(4)

The display program for assisting in determining the aircraft route according to any one of (1) to (3) above, wherein the weather risk acquisition process acquires a plurality of types of the weather risks, the first display process displays the plurality of types of routes and the plurality of types of weather risks together as a three-dimensional image, and is capable of switching some weather risks of the plurality of types of weather risks from a three-dimensional image to a two-dimensional image, and the second display process displays the weather risks except the some weather risks if the some weather risks of the plurality of types of weather risks are switched from a three-dimensional image to a two-dimensional image in the first display process.

(5)

The display program for assisting in determining the aircraft route according to any one of (1) to (4) above, wherein the display program is configured to be capable of executing an altitude adjustment process of adjusting an altitude of the route displayed by the second display process.

(6)

The display program for assisting in determining the aircraft route according to any one of (1) to (5) above, wherein the route acquisition process acquires a plurality of types of routes which have a takeoff point and a landing point in common, a navigation reproduction process of reproducing navigation on one route selected from the plurality of types of routes is executed, and the navigation reproduction process displays a navigation position with progression of navigation reproduction and displays a prediction of the weather risk with the progression.

(7)

The display program for assisting in determining the aircraft route according to any one of (1) to (6) above, wherein if the weather risk is present within a predetermined distance from at least either one of a takeoff point and a landing point of the route, an alert process of providing a warning display (a display of a warning icon and a telegram regarding a lightning strike risk level present within the predetermined distance) is executed.

(8)

The display program for assisting in determining the aircraft route according to any one of (1) to (7) above, wherein if the weather risk is present within a predetermined distance from at least either one of a takeoff point and a landing point of the route, a telegram generation process of generating a telegram regarding the weather risk present within the predetermined distance is executed.

(9)

A route determination assistance device for assisting in determining an aircraft route, comprising:

a route acquisition processing unit which acquires a route;

a weather risk acquisition processing unit which acquires a weather risk as three-dimensional information;

a first display processing unit which displaying, in plan view, at least each of the route and the weather risk together; and a second display processing unit which displays the route and the weather risk together on a cross section cut vertically along the route.

(10)

The route determination assistance device for assisting in determining the aircraft route according to (9) above, wherein the route acquisition processing unit acquires a plurality of types of routes which have a takeoff point and a landing point in common, the first display processing unit displays, in plan view, at least each of the plurality of types of routes and the weather risk together, and the second display processing unit displays, on a cross section cut vertically along one route selected from the plurality of types of routes, the one route and the weather risk together.

(11)

The route determination assistance device for assisting in determining the aircraft route according to (10) above, wherein the weather risk acquisition processing unit acquires a plurality of types of the weather risks, the first display processing unit displays the plurality of types of routes and the plurality of types of weather risks together as a three-dimensional image, and the second display processing unit displays, on a cross section cut vertically along one route selected from the plurality of types of routes, the one route and the plurality of types of weather risks together, and displays, in a region where different types of the weather risks overlap of a region of the cross section, one of the overlapping weather risks while giving priority to the one weather risk over the other weather risks.

(12)

The route determination assistance device for assisting in determining the aircraft route according to any one of (9) to (11) above, wherein the weather risk acquisition processing unit acquires a plurality of types of the weather risks, the first display processing unit displays the plurality of types of routes and the plurality of types of weather risks together as a three-dimensional image, and is capable of switching some weather risks of the plurality of types of weather risks from a three-dimensional image to a two-dimensional image, and the second display processing unit displays the weather risks except the some weather risks if the some weather risks of the plurality of types of weather risks are switched from a three-dimensional image to a two-dimensional image by the first display processing unit.

(13)

The route determination assistance device for assisting in determining an aircraft route according to any one of (9) to (12) above, comprising an altitude adjustment processing unit which adjusts an altitude of the route displayed by the second display processing unit.

(14)

The route determination assistance device for assisting in determining an aircraft route according to any one of (9) to (13) above, wherein the route acquisition processing unit acquires a plurality of types of routes which have a takeoff point and a landing point in common, the route determination assistance device includes a navigation reproduction processing unit which reproduces navigation on one route selected from the plurality of types of routes, and the navigation reproduction processing unit displays a navigation position with progression of navigation reproduction and displays a prediction of the weather risk with the progression.

(15)

The route determination assistance device according to any one of (9) to (14) above, comprising an alert processing unit which, if the weather risk is present within a predetermined distance from at least either one of a takeoff point and a landing point of the route, provides a warning display (a display of a warning icon and a telegram regarding a lightning strike risk level present within the predetermined distance).

(16)

The route determination assistance device for assisting in determining an aircraft route according to any one of (9) to (15) above, comprising a telegram generation processing unit which, if the weather risk is present within a predetermined distance from at least either one of a takeoff point and a landing point of the route, generates a telegram regarding the weather risk present within the predetermined distance.

This application claims priority to Japanese Patent Application No. 2022-117938, filed on Jul. 25, 2022, the entire disclosure of which is incorporated herein by reference.

REFERENCE SIGNS LIST

1 route determination assistance system
10 route determination assistance device
20 CPU

21 northbridge
22 southbridge
23 main memory
24 display controller
25 display
26 storage
27 sound controller
28 speaker
29 network controller
30 touch panel
31 various buttons
50 weather risk derivation device
100 weather information acquisition device
tb1 first tap button
tb2 second tap button
tb3 third tap button
sb scroll bar

The invention claimed is:

1. A route determination assistance device for assisting in determining an aircraft route, comprising:

a display including a first display region and a second display region;

a memory storing executable instructions; and a processor coupled to the memory and executing the instructions to:

acquire a plurality of different routes from a same takeoff point to a same landing point; and acquire a weather risk as three-dimensional information, wherein the display displays in the first display region, in plan view or in three dimensions, the plurality of different routes and the weather risk together, and wherein the display displays in the second display region, on a cross section cut vertically along one route among the plurality of different routes, the one route and the weather risk together.

2. The route determination assistance device for assisting in determining the aircraft route according to claim 1, wherein the processor executes the instructions to acquire a plurality of types of weather risks, the display displays in the first display region the plurality of different routes and the plurality of types of weather risks together as a three-dimensional image, the display displays in the second display region, on the cross section cut vertically along the one route, the one route and the plurality of types of weather risks together, and the display displays in the second display region, in a region where different types of the weather risks overlap in the cross section, one of the overlapping weather risks having priority over others in the overlapping weather risks.

3. The route determination assistance device for assisting in determining the aircraft route according to claim 1, wherein the processor executes the instructions to acquire a plurality of types of weather risks, the display displays in the first display region the plurality of different routes and the plurality of types of weather risks together as a three-dimensional image, the display switches at least one of the plurality of types of weather risks from a three-dimensional image to a two-dimensional image, and the display displays in the second display region, on the cross section cut vertically along the one route, the one route and the plurality of types of weather risks together without the at least one of the plurality of types of weather risks switched from the three-dimensional image to the two-dimensional image in the first display region.

4. The route determination assistance device for assisting in determining an aircraft route according to claim 3, wherein the processor executes the instructions to adjust an altitude of the one route displayed in the second display region.

5. The route determination assistance device according to claim 3, wherein the display displays in at least one of the first display region and the second display region a warning with the weather risk being present within a predetermined distance from at least either one of the takeoff point and the landing point.

6. The route determination assistance device for assisting in determining an aircraft route according to claim 3, wherein the display displays in at least one of the first display region and the second display region a telegram with the weather risk being present within a predetermined distance from at least either one of the takeoff point and the landing point.

7. A route determination assistance device for assisting in determining an aircraft route, comprising:

a display including a first display region and a second display region;

a memory storing executable instructions; and a processor coupled to the memory and executing the instructions to:

acquire a plurality of types of routes which have a takeoff point and a landing point in common;

acquire a plurality of weather risks as three-dimensional information;

reproduce navigation on one route selected from the plurality of types of routes; and display a navigation position with progression of navigation reproduction and display a prediction of the weather risk with the progression, wherein the display displays in the first display region, in plan view or in three dimensions, the plurality of types of routes and the plurality of weather risks together as a three-dimensional image, wherein the display switches at least one of the plurality of types of weather risks from a three-dimensional image to a two-dimensional image, and wherein the display displays in the second display region, on the cross section cut vertically along the one route, the one route and the plurality of types of weather risks together without the at least one of the plurality of types of weather risks switched from the three-dimensional image to the two-dimensional image in the first display region.

* * * * *